(12) United States Patent
Tang et al.

(10) Patent No.: US 11,169,544 B2
(45) Date of Patent: Nov. 9, 2021

(54) METHOD FOR DESIGNING THREE-DIMENSIONAL TRAJECTORY OF UNMANNED AERIAL VEHICLE BASED ON WIRELESS POWER TRANSFER NETWORK

(71) Applicant: SOUTH CHINA UNIVERSITY OF TECHNOLOGY, Guangdong (CN)

(72) Inventors: Jie Tang, Guangdong (CN); Wanmei Feng, Guangdong (CN); Yuli Fu, Guangdong (CN); Xiuyin Zhang, Guangdong (CN); Shaopeng Ao, Guangdong (CN); Junhui Ou, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 1 day.

(21) Appl. No.: 17/049,971

(22) PCT Filed: Nov. 1, 2019

(86) PCT No.: PCT/CN2019/114918
§ 371 (c)(1),
(2) Date: Oct. 23, 2020

(87) PCT Pub. No.: WO2021/062913
PCT Pub. Date: Apr. 8, 2021

(65) Prior Publication Data
US 2021/0255641 A1 Aug. 19, 2021

(30) Foreign Application Priority Data

Sep. 30, 2019 (CN) .......................... 201910942069.9

(51) Int. Cl.
*G05D 1/10* (2006.01)
*B64C 39/02* (2006.01)
(Continued)

(52) U.S. Cl.
CPC ........... *G05D 1/101* (2013.01); *B64C 39/024* (2013.01); *G05B 13/041* (2013.01);
(Continued)

(58) Field of Classification Search
CPC ...................................................... G05D 1/101
See application file for complete search history.

(56) References Cited

U.S. PATENT DOCUMENTS 8,396,730 B2 * 3/2013 Khosla ............... G06Q 10/0631
705/7.11
9,473,209 B2 * 10/2016 Cooper ................... H02J 50/12
(Continued)

FOREIGN PATENT DOCUMENTS

| CN | 105611633 | 5/2016 |
| CN | 109099918 | 12/2018 |

OTHER PUBLICATIONS

"International Search Report (Form PCT/ISA/210) of PCT/CN2019/114918," dated Jun. 18, 2020, pp. 1-5.
(Continued)

*Primary Examiner* — Alex C Dunn
(74) *Attorney, Agent, or Firm* — JCIPRNET

(57) ABSTRACT

The invention discloses a method for designing a three-dimensional trajectory of an unmanned aerial vehicle based on a wireless power transfer network. The method comprises the following steps: establishing a downlink channel model of the wireless power transfer network; establishing a mathematical model based on maximizing energy harvested by a user, comprising three-dimensional position deployment of an unmanned aerial vehicle, allocation of a charging time, and generation of an energy beam pattern; jointly optimizing on design and analysis of low-complexity iterative algorithms for three-dimensional position deployment of the unmanned aerial vehicle, the charging time and an energy
(Continued)

beam; and using branch and bound method to design a three-dimensional flight trajectory of the unmanned aerial vehicle.

9 Claims, 4 Drawing Sheets

(51) Int. Cl.
    *G08G 5/00* (2006.01)
    *G05B 13/04* (2006.01)
    *H02J 50/20* (2016.01)
    *H02J 50/40* (2016.01)
    *H02J 50/00* (2016.01)
    *H02J 50/12* (2016.01)

(52) U.S. Cl.
    CPC .......... *G08G 5/0034* (2013.01); *H02J 50/001* (2020.01); *H02J 50/20* (2016.02); *H02J 50/402* (2020.01); *B64C 2201/027* (2013.01); *B64C 2201/108* (2013.01); *H02J 50/12* (2016.02)

(56) References Cited

U.S. PATENT DOCUMENTS

| | | | | |
|---|---|---|---|---|
| 9,645,581 | B1* | 5/2017 | Yang | B64C 39/024 |
| 10,148,097 | B1* | 12/2018 | Leabman | H02J 50/20 |
| 10,203,701 | B2* | 2/2019 | Kurdi | G05D 1/104 |
| 10,536,214 | B2* | 1/2020 | Wu | H04B 17/318 |
| 10,733,015 | B2* | 8/2020 | Aronovich | G06F 9/50 |
| 10,764,829 | B2* | 9/2020 | Ge | H04W 52/0212 |

OTHER PUBLICATIONS

Jie Xu, et al., "UAV-Enabled Wireless Power Transfer: Trajectory Design and Energy Optimization," 2017 23rd Asia-Pacific Conference on Communications (APCC), May 2018, pp. 1-15.

Lipeng Zhu, et al., "3-D Beamforming for Flexible Coverage in Millimeter-Wave UAV Communications," IEEE Wireless Communications Letters, vol. 8, Jun. 2019, pp. 837-840.

* cited by examiner

METHOD FOR DESIGNING THREE-DIMENSIONAL TRAJECTORY OF UNMANNED AERIAL VEHICLE BASED ON WIRELESS POWER TRANSFER NETWORK

CROSS-REFERENCE TO RELATED APPLICATION

This is a continuation-in-part application of International Application No. PCT/CN2019/114918, filed on Nov. 1, 2019, which claims the priority benefits of China Application No. 201910942069.9, filed on Sep. 30, 2019. The entirety of each of the above-mentioned patent applications is hereby incorporated by reference herein and made a part of this specification.

TECHNICAL FIELD

The present invention relates to the field of wireless communication technologies, and more particularly, to a method for designing a three-dimensional trajectory of an unmanned aerial vehicle based on a wireless power transfer network.

BACKGROUND

Internet of Things (IoT), which enables heterogeneous smart devices to be connected with each other and enables the devices to collect and exchange information, is used in smart home, smart transfer systems and smart cities. According to Gartner, up to 840 million IoT devices were used all over the world in 2017, and the number is expected to reach 2.04 billion in 2020. Therefore, communication networks of next generation need to support large-scale device communication services, while the traditional communication networks cannot support such a high data requirement. The fifth generation network (5G) can make up for defects of the current communication networks, and provides a gigabit data rate and a low-delay communication service for connected devices.

In fact, the 5G network connects large-scale IoT devices and provides the gigabit data rate and the low-delay communication, which consumes a lot of power and shortens a service life of the IoT device, especially a battery-powered mobile device. A wireless power transfer (WPT) and energy harvesting (EH) technology is one of promising technologies to prolong a service life of a node of the mobile device in the 5G network. The WPT technology is defined as to wirelessly transmit energy to an electronic device through an energy source. Especially, inductive coupling and magnetic resonance coupling are two energy transfer technologies of the WPT. However transmission distances of the two are several centimeters and several meters respectively, which are not suitable for long-distance energy transfer. On the other hand, energy is contained in an electromagnetic wave (3 KHz to 300 GHz) and is transmitted to the electronic device by a radio frequency (RF) energy transfer technology, which has a transmission distance of tens of kilometers. Therefore, the WPT technology based on the RF can be applied to long-distance transmission. However, when a transmitting end and a receiving end are arranged in a disaster area or a remote mountainous area, the two ends are far apart from each other, which leads to inefficient energy transmission.

Due to the advantages of self-organization, flexibility and mobility, an unmanned aerial vehicle can be deployed quickly in the remote mountainous area and a geographically restricted area, and replace a local base station to provide reliable, economical and efficient wireless connection. Generally, the unmanned aerial vehicle comprises a low altitude platform (LAP) and a high altitude platform (HAP). The LAP has a maximum altitude of 400 feet, while the HAP can be as high as 17 km. On the other hand, the unmanned aerial vehicle may comprise a fixed wing and a rotor wing. In particular, a fixed-wing unmanned aerial vehicle can fly at a high speed for a long time, but cannot hover. A quadrotor unmanned aerial vehicle can hover, but has a low flight speed and a short flight time.

Due to the multiple advantages of the unmanned aerial vehicle, a technology of integrating the unmanned aerial vehicle with the wireless power transfer technology has been proposed in recent years and applied in many occasions to charge a low-power mobile device. However, limited by a capacity of a battery on a board, the flight time of the unmanned aerial vehicle is limited. Therefore, how to reduce aerodynamic consumption and maximize an energy efficiency of the unmanned aerial vehicle to extend a time of endurance of the unmanned aerial vehicle is researched by existing scholars. In addition, energy harvesting is improved and the flight time of the unmanned aerial vehicle is prolonged by optimizing a flight trajectory, position deployment, charging time allocation of the unmanned aerial vehicle, ect.

SUMMARY

Aiming at the defects in the prior art, the present invention is intended to establish a downlink channel model of a wireless power transfer network and a mathematical model based on maximizing energy harvested by a user, and propose a low-complexity iterative algorithm for jointly optimizing a three-dimensional position deployment of an unmanned aerial vehicle, a charging time and an energy beam, so as to maximize the energy harvested by the user while meeting a user coverage requirement in an area. In addition, the present invention establishes a mathematical model for minimizing a flight trajectory, and designs a minimum flight distance by using Branch and Bound, so as to prolong a time of endurance of the unmanned aerial vehicle while minimizing the flight distance. The technical problems to be solved by the present invention are as follows:

problem 1: the downlink channel model of the wireless power transfer (WPT) network is established in combination with a three-dimensional dynamic energy beam forming technology and a direct path;

problem 2: the mathematical model based on maximizing the energy harvested by the user is established for the downlink channel model;

problem 3: the low-complexity iterative algorithm for jointly optimizing the three-dimensional position deployment of the unmanned aerial vehicle, the charging time and the energy beam is analyzed and designed according to the specific mathematical model; and problem 4: the three-dimensional flight trajectory of the unmanned aerial vehicle is designed by using the Branch and Bound according to a three-dimensional hovering position of the unmanned aerial vehicle.

The objective of the present invention is achieved at least by one of the following technical solutions.

A method for designing a three-dimensional trajectory of an unmanned aerial vehicle based on a wireless power transfer network comprises the following steps:

step 1: establishing a downlink channel model of the wireless power transfer network: combining three-dimensional dynamic energy beam forming with a direct path to form a channel model between an unmanned aerial vehicle and a user;

step 2: establishing a mathematical model based on maximizing energy harvested by a user, comprising mathematical expressions for determining an optimization variable, an objective function and a constraint condition;

step 3: establishing a low-complexity iterative algorithm for jointly optimizing three-dimensional position deployment of the unmanned aerial vehicle, a charging time and an energy beam; and step 4: designing a three-dimensional flight trajectory of the unmanned aerial vehicle based on Branch and Bound.

Further, in the step 1:

the wireless power transfer network comprises a quadrotor unmanned aerial vehicle and K users randomly distributed on land, the unmanned aerial vehicle is provided with a linear array comprising M antenna elements, while the users on land are provided with a single antenna; a land geometric area is divided into $\Gamma$ service areas; a position coordinate of a user k is $z_k=(x_k, y_k, 0)$, and $k \in \{1, \ldots, K\}$ is an index of an user set; a three-dimensional position of the unmanned aerial vehicle is $z_u=(x_u, y_u, h)$, and h represents an altitude of the unmanned aerial vehicle; and a wireless channel between the unmanned aerial vehicle and the user k is dominated by the direct path, so that a channel vector $h_k$ is as follows:

$$h_k = \sqrt{\beta_0 d_k^{-\alpha}} \alpha(\theta, \phi), \quad (1)$$

wherein $\eta_k = \beta_0 d_k^{-1}$ is a multiplexing coefficient, and $\beta_0$ is a channel power gain when a reference distance is 1 m; in addition, $d_k = \sqrt{(x_k-x_u)^2+(y_k-y_u)^2+h^2}$ is a distance between the unmanned aerial vehicle and the user k, $\alpha$ is a path loss coefficient; and $\alpha(\theta, \phi)$ is a direction vector, which is expressed as follows:

$$\alpha(\theta, \phi) = [1, e^{j2\pi/\lambda d_{array} \sin\theta \cos\phi}, \ldots, e^{j(M-1)2\pi/\lambda d_{array} \sin\theta \cos\phi}]^T, \quad (2)$$

wherein $\lambda$ and $d_{array}$ are respectively a wavelength and an element spacing in the linear array, and an elevation angle $\theta$ and an azimuth angle $\phi$ are known quantities; therefore, a channel gain between the unmanned aerial vehicle and the user k is expressed as follows:

$$|h_k^H w|^2 = \frac{\beta_0}{[(x_k-x_u)^2+(y_k-y_u)^2+h^2]^{\alpha/2}} |\alpha^H(\theta, \phi)w|^2, \quad (3)$$

wherein H represents conjugate transpose, w is a beam weight vector, and a main lobe direction is controlled by adjusting a weight value; and $E(\theta, \phi) = \alpha^H(\theta, \phi)w$ is a synthesized pattern of the linear array;

the linear array installed on the unmanned aerial vehicle as a transmitting end is divided into t sub-arrays, and each sub-array independently generates an energy beam to aim at a certain user; therefore, for the linear array comprising M antenna elements, an array factor and a synthesized pattern are expressed as follows:

$$AF = \sum_{m=1}^{M=1} I_m \times e^{j(m-1)(\kappa\beta\sin\theta\cos\phi+\beta)}, \quad (4)$$

$$E(\theta, \phi) = \sum_{m=1}^{M=1} p_m(\theta, \phi) I_m \times e^{j(m-1)(\kappa d\sin\theta\cos\phi+\beta)}, \quad (5)$$

wherein $\kappa = 2\pi/\lambda$, $p_m(\theta, \phi)$ and $I_m$ are respectively an element pattern and an excitation amplitude of an $m^{th}$ antenna element, and $\beta$ is a uniformly graded phase; and d is an array element spacing, and e is a natural constant.

Further, in the step 2, total energy harvested by the user k is expressed as follows:

$$Q_k = \xi_k |h_k^H w|^2 P_0 \tau_{k,\gamma} \quad (6)$$

$$= \frac{\xi_k \beta_0 P_0 \tau_{k,\gamma} |E(\theta, \phi)|^2}{[(x_k-x_u)^2+(y_k-y_u)^2+h^2]^{\alpha/2}}, \quad (7)$$

wherein $\xi_k$ is an energy conversion efficiency, $0 < \xi_k < 1$, $P_0$ is a transmitting power of the unmanned aerial vehicle, and $\tau_{k,\gamma}$ is a charging time of the user k in a $\gamma^{th}$ area;

Therefore, optimization variables of the mathematical model based on maximizing the energy harvested by the user comprise:

1) a two-dimensional coordinate of the unmanned aerial vehicle, which is namely $z_u=(x_u, y_u, 0)$;
2) an altitude h of the unmanned aerial vehicle;
3) an energy beam pattern $E(\theta, \phi)$ of the linear array; and
4) a charging time $\tau_{k,\gamma}$ of the user k located in the $\gamma^{th}$ service area;

constraint conditions of the mathematical model based on maximizing the energy harvested by the user comprise:

(1) a maximum horizontal distance between the unmanned aerial vehicle and the user being no more than a coverage radius of the unmanned aerial vehicle: $\|z_k-z_u\|^2 \leq h^2 \tan^2\Theta$; and $\Theta$ being a beam width;

(2) a total charging time of the unmanned aerial vehicle in all the $\Gamma$ service areas being no more than a charging period T:

$$\sum_{\gamma=1}^{\Gamma} \tau_{k,\gamma} = T;$$

(3) the altitude of the unmanned aerial vehicle being constrained to: $h_{min} < h < h_{max}$, wherein $h_{min}$ and $h_{max}$ are respectively a lowest altitude and a highest altitude that the unmanned aerial vehicle is able to reach;

the mathematical model based on maximizing the energy harvested by the user is as follows:

$$\max_{z_u, h, \tau_{k,\gamma}, E(\theta,\phi)} \sum_{k=1}^{K} \frac{\xi_k \beta_0 P_0 \tau_{k,\gamma} |E(\theta, \phi)|^2}{[\|z_k - z_u\|^2 + h^2]^{\alpha/2}} \quad (8a)$$

$$\text{s.t.} \|z_k - z_u\|^2 \leq h^2 \tan^2\Theta, \quad (8b)$$

$$\sum_{\gamma=1}^{\Gamma} \tau_{k,\gamma} = T, \quad (8c)$$

$$h_{min} < h < h_{max}. \quad (8d)$$

Further, in the step 3, system parameters, a value range of the optimization variables and the constraint conditions of the wireless power transfer network are set; and the low-complexity algorithm comprises the following steps:

S1. fixing the altitude h, the beam pattern $E(\theta, \phi)$ and the charging time $\tau_{k,\gamma}$ of the unmanned aerial vehicle, and solving the objective function with respect to a two-dimensional coordinate $(x_u, y_u)$ of the unmanned aerial vehicle by using sequential unconstrained convex minimization (SUCM) at the moment;

S2. fixing the beam pattern $E(\theta, \phi)$ and the charging time $\tau_{k,\gamma}$ based on the two-dimensional coordinate $(x_u, y_u)$ of the unmanned aerial vehicle, the objective function becoming a monotone decreasing function with respect to the altitude h at the moment, and obtaining an optimal altitude $$h^* = \max\left\{\frac{\sqrt{D_{max}}}{\tan\Theta}, h_{min}\right\},$$

while $D_{max} = \max_{k=1,\ldots,K} D_k$, and $D_k = \|z_k - z_u\|^2$;

S3. fixing the charging time $\tau_{k,\gamma}$ based on the three-dimensional position deployment of the unmanned aerial vehicle, and optimizing the energy beam pattern by using a multiobjective evolutionary algorithm based on decomposition (MOEA/D), wherein the energy beam pattern comprises an antenna gain, a minor lobe voltage level and a beam width, and since the antenna gain, the minor lobe voltage level and the beam width are functions with respect to a phase $\beta$, the antenna gain, the minor lobe voltage level and the beam width optimized are expressed as a multiobjective optimization problem with respect to the phase $\beta$; and S4. based on the optimal three-dimensional position, the optimal altitude and the optimal energy beam pattern of the unmanned aerial vehicle which are solved, solving the objective function which is a linear programming problem of a function with respect to the charging time $\tau_{k,\gamma}$ at the moment by using a standard convex optimization tool.

Further, the step S1 comprises the following steps.

S1.1. initializing iteration times m, a polyhedron $$S^{(1)} = \left\{t \in R_-^K : -\sum_{k=1}^{K} t_k \leq \frac{1}{\varsigma}\right\}$$

and a vertex set $$v^{(1)} = \left\{-\frac{1}{\varsigma}e_k \in R^K : 1 \leq k \leq K\right\} \cup \{0\},$$

wherein $R_-^K$ is a K-dimensional negative real number, and $R^K$ is a K-dimensional non-negative real number; a best feasible solution of $\max_{t \in \tilde{D}} v^T t$ is $t^*$, satisfying $q(t_0) < q(t^*)$, wherein $t_0$ is a known quantity, while $t^*$ is a solved quantity; $q(t) = A_k t^{-\alpha/2}$, and $A_k = \xi_k \beta_0 P_0 \tau_{k,\gamma} |E(\theta, \phi)|^2$; $\varsigma > 0$; $\tilde{D} = \{t - t_0 | t \in D\}$, $D = \{t \in R_+^K : \varepsilon_k(x_u, y_u) \leq t_k, =1, \ldots, K\}$, and D is a domain of definition of t, $\tilde{D}$ is a domain of definition of $t-t_0$, and $\varepsilon_k(x_u, y_u) = (x_k - x_u)^2 + (y_k - y_u)^2 + h^2$;

S1.2. for all $-w = v$, $v \in V^m$, solving $$\min_{x_u, y_u} \sum_{k=1}^{K} w_k[(x_k - x_u)^2 + (y_k - y_u)^2 + h^2]^{\alpha/2}$$

to obtain optimal values $\mu(w)$ and $(x_u^*, y_u^*)$, wherein $$x_u^* = \frac{\sum_{k=1}^{K} w_k x_k}{\sum_{k=1}^{K} w_k},$$

and $$y_u^* = \frac{\sum_{k=1}^{K} w_k x_k}{\sum_{k=1}^{K} w_k},$$

wherein $w = [w_1, \ldots, w_k]$ is a k-dimensional vector, and $v^m$ is a m-dimensional vector;

S1.3. judging whether an inequality $\max_{-w \in v^m} -\mu(w) + w^T t_0 \leq 1$ is true, and if the inequality is true, returning to the S1.1; and if the inequality is not true, skipping to the step S1.4;

S1.4. obtaining $\tilde{w} = [\tilde{w}_1, \ldots, \tilde{w}_k]$ through $\max_{-w \in v^m} -\mu(w) + w^T t_0$, and $\tilde{t}_k = \varepsilon_k(\tilde{x}_u, \tilde{y}_u)$, $k = 1, \ldots, K$, wherein $\varepsilon_k(\tilde{x}_u, \tilde{y}_u) = (x_k - \tilde{x}_u)^2 + (y_k - \tilde{y}_u)^2 + h^2$; and after obtaining $\tilde{w}$ and $\tilde{t}_k$, further obtaining a two-dimensional position $(\tilde{x}_u, \tilde{y}_u)$ of the unmanned aerial vehicle, while $(\tilde{x}_u, \tilde{y}_u)$ is obtained respectively by the following formulas $$\tilde{x}_u = \frac{\sum_{k=1}^{K} \tilde{w}_k x_k}{\sum_{k=1}^{K} \tilde{w}_k}$$

and $$\tilde{y}_u = \frac{\sum_{k=1}^{K} \tilde{w}_k x_k}{\sum_{k=1}^{K} \tilde{w}_k};$$

S1.5. judging whether an inequality $q(\tilde{t}) \leq q(t^*)$ is true, and if the inequality is true, updating $t^* = \tilde{t}$, wherein $\tilde{t} = [\tilde{t}_1, \ldots, \tilde{t}_k]$; otherwise, calculating $\vartheta$ and $S^{(m+1)}$ by using $\vartheta = \sup\{\rho : q(t_0 + \rho^*(\tilde{t} - t_0)) \leq q(t^*)\}$ and $S^{(m+1)} = S^{(m)} \cap \{t^T(\tilde{t} - t_0) \leq 1/\vartheta\}$ respectively, wherein $\vartheta \geq 1$; and under a condition of obtaining variables $\rho$ and $\vartheta$, using an analytic center cutting-plane method (ACCPM) algorithm to cut the polyhedron; and S1.6. judging whether iteration times m of the algorithm satisfy set times, if the set times are not satisfied, $m := m+1$, returning to the step S1.2, and if the set times are satisfied, obtaining the two-dimensional position $(x_u^*, y_u^*)$ of the unmanned aerial vehicle.

Further, in the step S2, the beam pattern $E(\theta, \phi)$ and the charging time $\tau_{k,\gamma}$ are fixed based on the obtained two-dimensional position of the unmanned aerial vehicle, and the optimization problem is expressed as follows at the moment:

$$\max_{h} \sum_{k=1}^{K} \frac{A_k}{[D_k + h^2]^{\alpha/2}} \quad (9a)$$

$$s.t. D_{max} \leq h^2 \tan \Theta, \quad (9b)$$

$$h_{min} \leq h \leq h_{max}, \quad (9c)$$

wherein a constraint condition $D_{max} \leq h^2 \tan \Theta$ shows that a distance between the unmanned aerial vehicle and all the users is not allowed to exceed the coverage radius of the unmanned aerial vehicle; and since the optimization problem is a convex optimization problem, while the objective function is a monotone decreasing function with respect to the altitude h of the unmanned aerial vehicle, then the optimal altitude is as follows:

$$h^* = \max\left\{\frac{\sqrt{D_{max}}}{\tan \Theta}, h_{min}\right\} \quad (10)$$

Further, the step S3 comprises the following steps:

S3.1. fixing the charging time $\tau_{k,\gamma}$ based on the obtained three-dimensional position $(x_u^*, y_u^*, h^*)$ of the unmanned aerial vehicle, so that the objective function is expressed as follows:

$$\max \sum_{k=1}^{K} \eta_k |E(\theta, \phi)|^2, \quad (11)$$

wherein $$\eta_k = \frac{\xi_k \beta_0 P_0 \tau_{k,\gamma}}{[\|z_k - z_u\|^2 + h^2]^{\alpha/2}}$$

is a constant; therefore, the objective function is expressed as follows:

$$\max \sum_{k=1}^{K} |E(\theta, \phi)|^2 \quad (12)$$

S3.2. modeling into a multiobjective optimization problem, and the objective functions of the multiobjective optimization problem are expressed as follows:

$$\min F(\beta) = (f_1(\beta), f_2(\beta), f_3(\beta))^T, \quad (13a)$$

$$s.t. \beta \in R^M, \quad (13b)$$

wherein $f_1 = SLL(\beta)$: an objective function of a minimized minor lobe voltage level with respect to $$\beta; f_2(\beta) = \frac{1}{|E(\theta, \phi)|}:$$

an objective function of a maximized antenna gain with respect to $\beta$; and $$f_3(\beta) = \frac{1}{|\Theta|}:$$

an objective function of a maximized beam width $\Theta$ of the array antenna with respect to $\beta$;

S3.3. definition of domination: assuming that $u, v \in R^m$, u dominating v, and if and only if $$u_i \leq v_i, \forall i \in \{1, \ldots m\}, \quad (14)$$

$$u_j < v_j, \forall j \in \{1, \ldots m\}; \quad (15)$$

S3.4. definition of Pareto optimality: $x^* \in \Omega$ being the Pareto optimality, satisfying a condition that no other solution $x \in \Omega$ exists, so that $F(x)$ dominates $F(x^*)$, and $F(x^*)$ being a Pareto optimal vector; and S3.5. aiming at the constructed multiobjective optimization problem, using the MOEA/D to generate a directional beam.

Further, the MOEA/D has the specific steps as follows:

A1. inputting: the constructed multiobjective optimization problem; Iter: iteration times; $N_{pop}$: a number of subproblems; $\kappa^1, \ldots, \kappa^{N_{pop}}$: a weight vector; and $T_{nei}$: a number of neighbor vectors of each weight vector;

A2. initializing: a set EP=Ø;

A3. for each $i=1, \ldots, N_{pop}$, setting $\hbar(i)=\{i_1 \ldots, i_{T_{nei}}\}$ as an index of the neighbor vector according to $T_{nei}$ weight vectors $\kappa^1, \ldots, \kappa^{N_{pop}}$ near an Euclidean distance weight i the most;

A4. randomly generating an original group $\beta=[\beta_1, \ldots, \beta_{N_{pop}}]$; and setting $FV_i=F(\beta_i)$;

A5. for each $j=1, \ldots, d$, initializing $z=(z_1, \ldots, z_j, \ldots, z_d)^T$ through $z_j=\min\{f_j(\beta), \beta \in R^M\}$, wherein d is a number of objective functions;

A6. updating: for each $i=1, \ldots, N_{pop}$, randomly selecting two indexes $\kappa$ and $\iota$ from a set $\hbar(i)$, and combining $\beta_\kappa$ and $\beta_\iota$ to generate a new feasible solution y by a differential evolution algorithm; for each $j=1, \ldots, d$, if $z_j > f_j(y)$, setting $z_j = f_j(y)$; at the moment, $z_j$ being a current optimal solution; for each $j \in \hbar(i)$, if $g^{te}(y|\kappa^j, z) \leq g^{te}(\beta_j|\kappa^j, z)$, setting $\beta_j = y$ and $FV_j = F(y)$, wherein $g^{te}(y|\kappa^j, z) = \max_{1 \leq j \leq d}\{\kappa^j|f_j(y)-z_j\}$; eliminating a solution dominated by F(y) from the set EP; and if no vector exists in the set EP to dominate F(y), adding F(y) into the set EP;

A7. stopping criterion: if the iteration times satisfy Iter, entering into step A8; otherwise, returning to the updating step A6; and A8. outputting: constantly updating a non-dominant solution EP during searching, and finally obtaining an optimal domination set EP*, and a Pareto optimal solution $\beta^*$, so that $EP^* \in \beta^*$.

Further, in the step S4, based on the obtained three-dimensional position $(x_u^*, y_u^*, h^*)$ of the unmanned aerial vehicle and the beam pattern $E^*(\theta, \phi)$, the original problems become:

$$\max_{\tau_{k,\gamma}} \sum_{k=1}^{K} \frac{\xi_k \beta_0 P_0 \tau_{k,\gamma} |E(\theta, \phi)|^2}{[\|z_k - z_u\|^2 + h^2]^{\alpha/2}} \quad (16a)$$

$$s.t. \sum_{\gamma=1}^{\Gamma} \tau_{k,\gamma} = T; \quad (16b)$$

The solution of the above problems may lead to serious fairness problems, and the reason is that when the total energy harvested in a certain area is significantly greater than that in other areas, the charging time in this area is longer; and in order to solve this difficulty, the following new optimization problems are proposed:

$$\max_{\tau_{k,\gamma}} \sum_{k=1}^{K} \min_{k \in K} \frac{\xi_k \beta_0 P_0 \tau_{k,\gamma} |E(\theta, \phi)|^2}{[(x_k - x_{u,\gamma})^2 (y_k - y_{u,\gamma})^2 + h_\gamma^2]^{\alpha/2}} \quad (17a)$$

$$\text{s.t.} \sum_{\gamma=1}^{\Gamma} \tau_{k,\gamma} = T; \quad (17b)$$

at the moment, the three-dimensional position of the unmanned aerial vehicle in the area γ is $(x_{u,\gamma}, y_{u,\gamma}, h_\gamma)$; and in order to solve this problem, an auxiliary variable t is introduced, then:

$$\max_{\tau_{k,\gamma}} t \quad (18a)$$

$$\text{s.t.} \sum_{\gamma=1}^{\Gamma} \tau_{k,\gamma} \varrho(x_{u,\gamma}, y_{u,\gamma}, h_\gamma) \geq t, \quad (18b)$$

$$\sum_{\gamma=1}^{\Gamma} \tau_{k,\gamma} = T, \quad (18c)$$

wherein $$\varrho(x_{u,\gamma}, y_{u,\gamma}, h_\gamma) = \sum_{k=1}^{K} \frac{\xi_k \beta_0 P_0 \tau_{k,\gamma} |E(\theta, \phi)|^2}{[(x_k - x_{u,\gamma})^2 + (y_k - y_{u,\gamma})^2 + h_\gamma^2]^{\alpha/2}};$$

and the optimization problem is a linear programming problem, which may be solved by a general convex optimization tool.

In the step 4, an objective function of optimization problems based on a minimized flight distance is the minimized flight distance, which is expressed as follows:

$$\sum_{\substack{a=0 \\ a \neq b}}^{\Gamma} \sum_{\substack{b=0 \\ a \neq b}}^{\Gamma} d_{ab} x_{ab}, \quad (19)$$

optimization variables of the optimization problems are able to be expressed as:

1> a distance $d_{ab} = \sqrt{(x_a - x_b)^2 + (y_a - y_b)^2 + (h_a - h_b)^2}$ between a hovering position a with a coordinate $(x_a, y_a, h_a)$ and a hovering position b with a coordinate $(x_b, y_b, h_b)$; and 2> a non-negative integer $x_{ab} \in \{0,1\}$;

constraint conditions of the optimization problem comprise:

1] a number of times of flying from the hovering position a to the hovering position b being no more than 1:

$$\sum_{\substack{a=0 \\ a \neq b}}^{\Gamma} x_{ab} = 1;$$

2] a number of times of flying from the hovering position b to the hovering position a being no more than 1:

$$\sum_{\substack{b=0 \\ b \neq a}}^{\Gamma} x_{ab} = 1;$$

3] a number of times of flying from the hovering position a to an original position 0 is no more than 1:

$$\sum_{a=1}^{\Gamma} x_{a0} = 1;$$

and

4] a number of times of staying on the hovering position being no more than γ: $\mu_a - \mu_b + \gamma x_{ab} \leq \gamma - 1$, wherein $\gamma > \Gamma$, $\mu_a$ and $\mu_b$ are arbitrary real variables, and a=1, ..., Γ, b=1, ..., Γ;

the optimization problems based on the minimized flight distance are as follows:

$$\min \sum_{\substack{a=0 \\ a \neq b}}^{\Gamma} \sum_{\substack{b=0 \\ b \neq a}}^{\Gamma} d_{ab} x_{ab} \quad (20a)$$

$$\text{s.t.} \sum_{\substack{a=0 \\ a \neq b}}^{\Gamma} x_{ab} = 1, \quad (20b)$$

$$\sum_{\substack{b=0 \\ b \neq a}}^{\Gamma} x_{ab} = 1, \quad (20c)$$

$$\sum_{a=1}^{\Gamma} x_{a0} = 1, \quad (20d)$$

$$\mu_a - \mu_b + \gamma x_{ab} \leq \gamma - 1; \quad (20e)$$

the steps for obtaining the optimal flight trajectory by the Branch and Bound are as follows:

firstly, decomposing all flight trajectory sets, namely feasible solutions, into smaller sets by the low-complexity algorithm, and calculating a lower bound of each set; then, containing a set of a smallest lower bound in all the sets in the optimal trajectory; and finally, forming all the selected sets into the optimal flight trajectory.

Compared with the prior art, the present invention has the following advantages and beneficial effects.

According to the method for designing the three-dimensional flight trajectory based on the wireless power transfer network of the unmanned aerial vehicle and allocating the charging time provided by the present invention, the downlink channel model of the wireless power transfer network and the mathematical model based on maximizing the energy harvested by the user are established, and the low-complexity algorithm for jointly optimizing the three-dimensional position deployment of the unmanned aerial vehicle, the charging time and the energy beam is proposed, so as to maximize the energy harvested by the user while meeting a user coverage requirement in an area. In addition, the present invention establishes a mathematical model for minimizing a flight trajectory, and designs a minimum flight distance by using the Branch and Bound, so as to prolong a time of endurance of the unmanned aerial vehicle while minimizing the flight distance. Compared with a single-beam WPT system, a single-antenna WPT system and a WPT system based on two-dimensional unmanned aerial vehicle deployment, the proposed three-dimensional dynamic multi-beam WPT system has a higher energy harvesting efficiency.

DETAILED DESCRIPTION

The specific implementation of the present invention is further described in detail hereinafter with reference to the embodiments and the accompanying drawings, but the implementation modes of the present invention are not limited to this.

Figure 1:
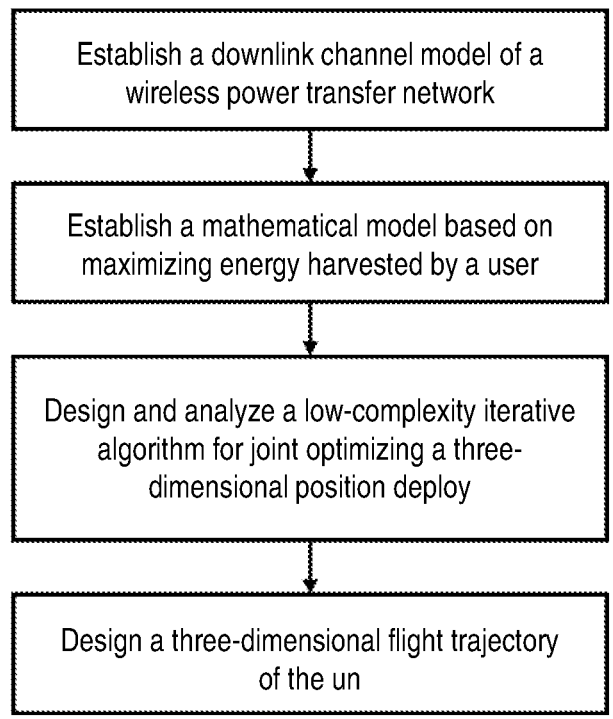
FIG. 1 is a flowchart of a method for designing a three-dimensional flight trajectory based on a wireless power transfer network of an unmanned aerial vehicle and allocating a charging time in the embodiment of the present invention.

As shown in FIG. 1, a method for designing a three-dimensional trajectory of an unmanned aerial vehicle based on a wireless power transfer network comprises the following steps.

Figure 2:
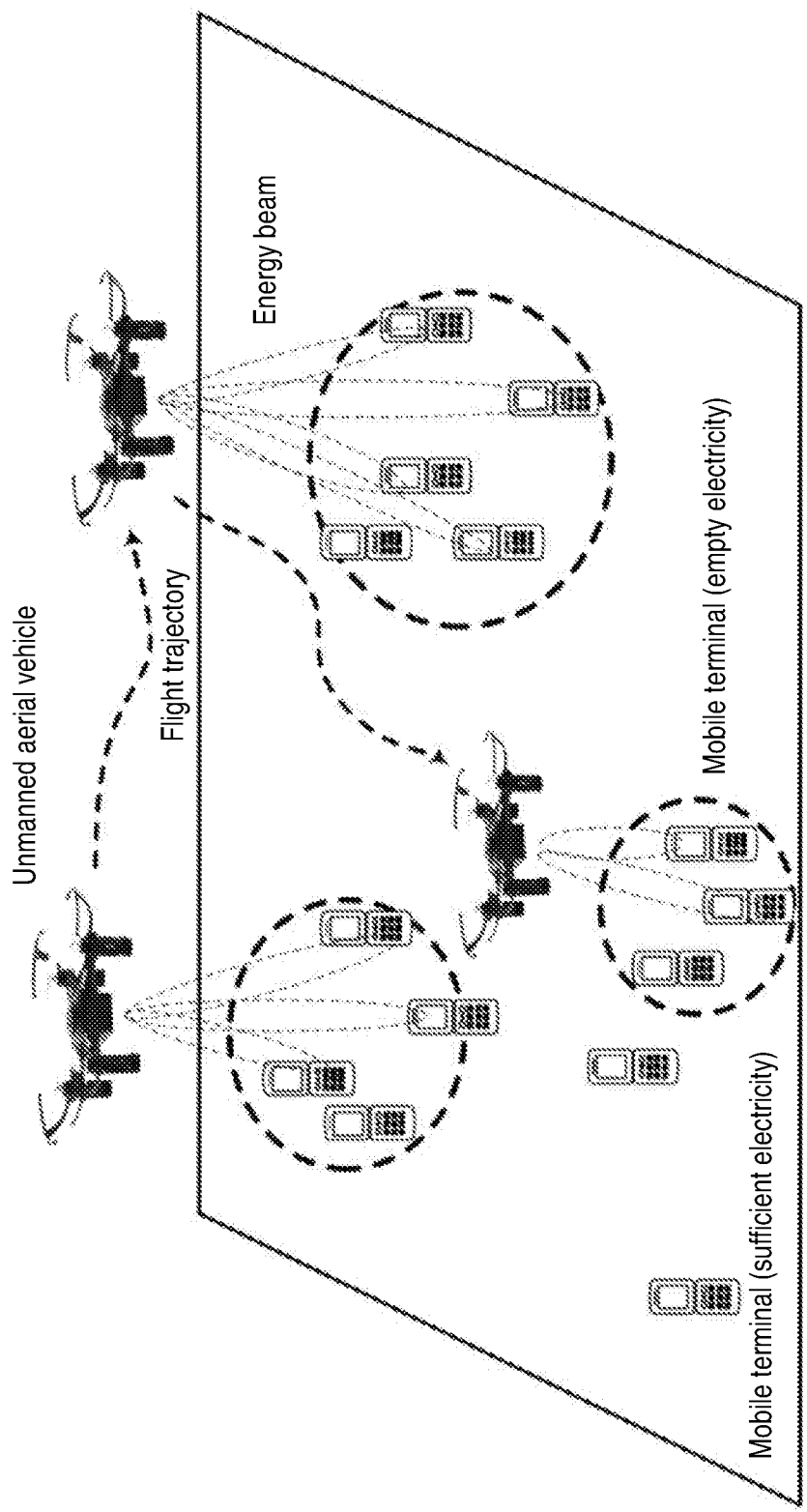
FIG. 2 is a diagram of a multi-beam wireless power transfer network model of the unmanned aerial vehicle in the embodiment of the present invention.
Figure 3:
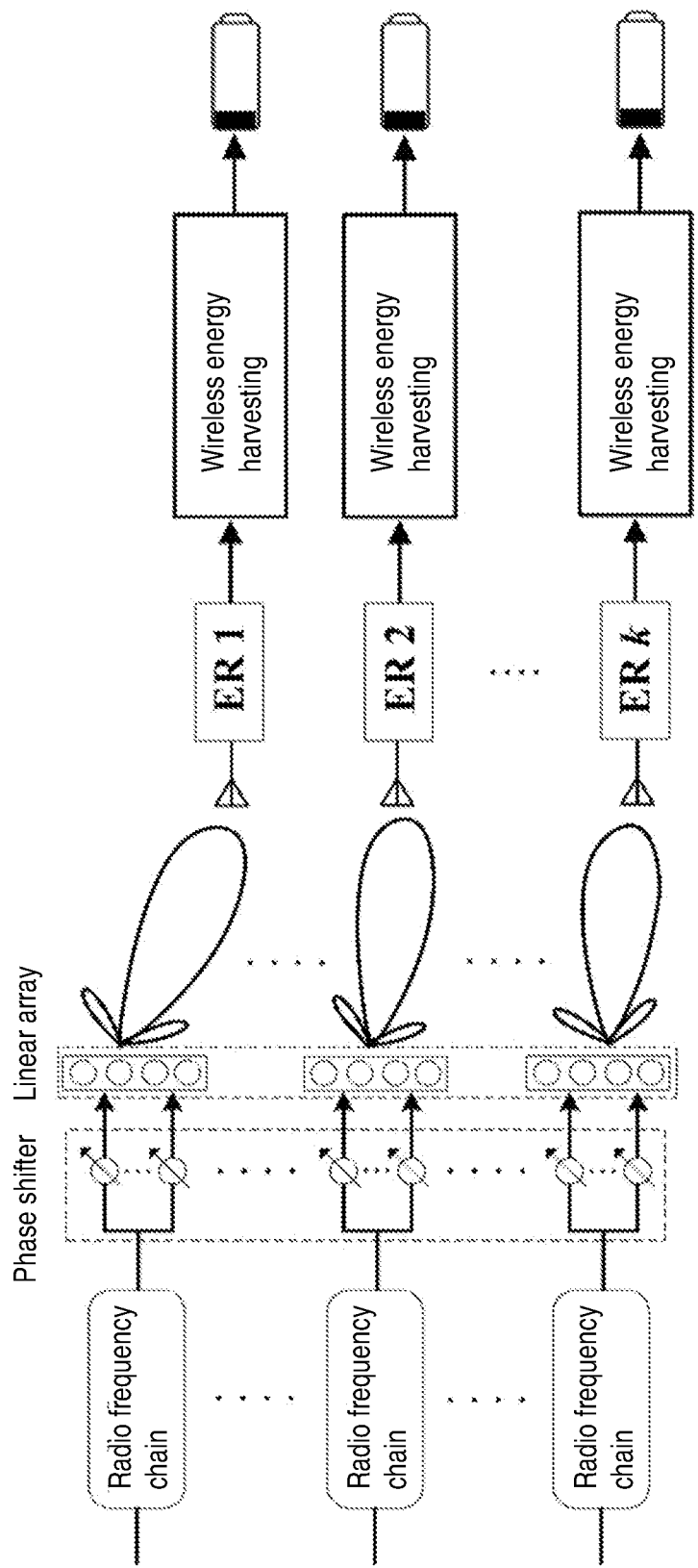
FIG. 3 is a diagram of a receiving and transmitting structure based on wireless power transfer of the unmanned aerial vehicle in the embodiment of the present invention.

In step 1, a downlink channel model of the wireless power transfer network is established: as shown in FIG. 2 and FIG. 3, three-dimensional dynamic energy beam forming is combined with a direct path to form a channel model between an unmanned aerial vehicle and a user.

The wireless power transfer network comprises a quadrotor unmanned aerial vehicle and K users randomly distributed on land, the unmanned aerial vehicle is provided with a linear array comprising M antenna elements, while the users on land are provided with a single antenna; a land geometric area is divided into r service areas; a position coordinate of a user k is $z_k=(x_k, y_k, 0)$, and $k \in \{1, \ldots, K\}$ is an index of an user set; a three-dimensional position of the unmanned aerial vehicle is $z_u=(x_u, y_u, h)$, and h represents an altitude of the unmanned aerial vehicle; and a wireless channel between the unmanned aerial vehicle and the user k is dominated by the direct path, so that a channel vector $h_k$ is as follows:

$$h_k = \sqrt{\beta_0 d_k^{-\alpha}} \alpha(\theta, \phi), \quad (1)$$

wherein $\eta_k=\beta_0 d_k^{-1}$ is a multiplexing coefficient, and $\beta_0$ is a channel power gain when a reference distance is 1 m; in addition, $d_k=\sqrt{(x_k-x_u)^2+(y_k-y_u)^2+h^2}$ is a distance between the unmanned aerial vehicle and the user k, $\alpha$ is a path loss coefficient; and $\alpha(\theta, \phi)$ is a direction vector, which is expressed as follows:

$$\alpha(\theta,\phi)=[1, e^{j2\pi/\lambda d_{array}\sin\theta\cos\phi}, \ldots, e^{j(M-1)2\pi/\lambda d_{array}\sin\theta\cos\phi}]^T, \quad (2)$$

wherein $\lambda$ and $d_{array}$ are respectively a wavelength and an element spacing in the linear array, and an elevation angle $\theta$ and an azimuth angle $\phi$ are known quantities; therefore, a channel gain between the unmanned aerial vehicle and the user k is expressed as follows:

$$|h_k^H w|^2 = \frac{\beta_0}{[(x_k-x_u)^2+(y_k-y_u)^2+h^2]^{\alpha/2}} |\alpha^H(\theta, \phi)w|^2, \quad (3)$$

wherein H represents conjugate transpose, w is a beam weight vector, and a main lobe direction is controlled by adjusting a weight value; and $E(\theta, \phi)=\alpha^H(\theta, \phi)w$ is a synthesized pattern of the linear array;

the linear array installed on the unmanned aerial vehicle as a transmitting end is divided into t sub-arrays, and each sub-array independently generates an energy beam to aim at a certain user; therefore, for the linear array comprising M antenna elements, an array factor and a synthesized pattern are expressed as follows:

$$AF = \sum_{m=1}^{M=1} I_m \times e^{j(m-1)(\kappa\beta\sin\theta\cos\phi+\beta)}, \quad (4)$$

$$E(\theta, \phi) = \sum_{m=1}^{M=1} p_m(\theta, \phi) I_m \times e^{j(m-1)(\kappa d\sin\theta\cos\phi+\beta)}, \quad (5)$$

wherein $\kappa=2\pi/\lambda$, $p_m(\theta, \phi)$ and $I_m$ are respectively an element pattern and an excitation amplitude of an $m^{th}$ antenna element, and $\beta$ is a uniformly graded phase; and d is an array element spacing, and e is a natural constant.

In step 2, a mathematical model based on maximizing energy harvested by a user is established, comprising mathematical expressions for determining an optimization variable, an objective function and a constraint condition.

Total energy harvested by the user k is expressed as follows:

$$Q_k = \xi_k |h_k^H w|^2 P_0 \tau_{k,\gamma} \quad (6)$$

$$= \frac{\xi_k \beta_0 P_0 \tau_{k,\gamma} |E(\theta, \phi)|^2}{[(x_k-x_u)^2+(y_k-y_u)^2+h^2]^{\alpha/2}}, \quad (7)$$

wherein $\xi_k$ is an energy conversion efficiency, $0<\xi_k<1$, $P_0$ is a transmitting power of the unmanned aerial vehicle, and $\tau_{k,\gamma}$ is a charging time of the user k in a $\gamma^{th}$ area;

Therefore, optimization variables of the mathematical model based on maximizing the energy harvested by the user comprise:

1) a two-dimensional coordinate of the unmanned aerial vehicle, which is namely $z_u=(x_u, y_u, 0)$;
2) an altitude h of the unmanned aerial vehicle;
3) an energy beam pattern $E(\theta, \phi)$ of the linear array; and
4) a charging time $\tau_{k,\gamma}$ of the user k located in the $\gamma^{th}$ service area;

constraint conditions of the mathematical model based on maximizing the energy harvested by the user comprise:

(1) a maximum horizontal distance between the unmanned aerial vehicle and the user being no more than a coverage radius of the unmanned aerial vehicle: $\|z_k-z_u\|^2 \leq h^2 \tan^2\Theta$; and $\Theta$ being a beam width;

(2) a total charging time of the unmanned aerial vehicle in all the r service areas being no more than a charging period T:

$$\sum_{\gamma=1}^{\Gamma} \tau_{k,\gamma} = T;$$

(3) the altitude of the unmanned aerial vehicle being constrained to: $h_{min} < h < h_{max}$, wherein $h_{min}$ and $h_{max}$ are respectively a lowest altitude and a highest altitude that the unmanned aerial vehicle is able to reach;

the mathematical model based on maximizing the energy harvested by the user is as follows:

$$\max_{z_u, h, \tau_{k,\gamma}, E(\theta,\phi)} \sum_{k=1}^{K} \frac{\xi_k \beta_0 P_0 \tau_{k,\gamma} |E(\theta,\phi)|^2}{[\|z_k - z_u\|^2 + h^2]^{\alpha/2}} \quad (8a)$$

$$\text{s.t.} \|z_k - z_u\|^2 \leq h^2 \tan^2\Theta, \quad (8b)$$

$$\sum_{\gamma=1}^{\Gamma} \tau_{k,\gamma} = T, \quad (8c)$$

$$h_{min} < h < h_{max}. \quad (8d)$$

In step 3, a low-complexity iterative algorithm for jointly optimizing three-dimensional position deployment of the unmanned aerial vehicle, a charging time and an energy beam is established.

Figure 4:
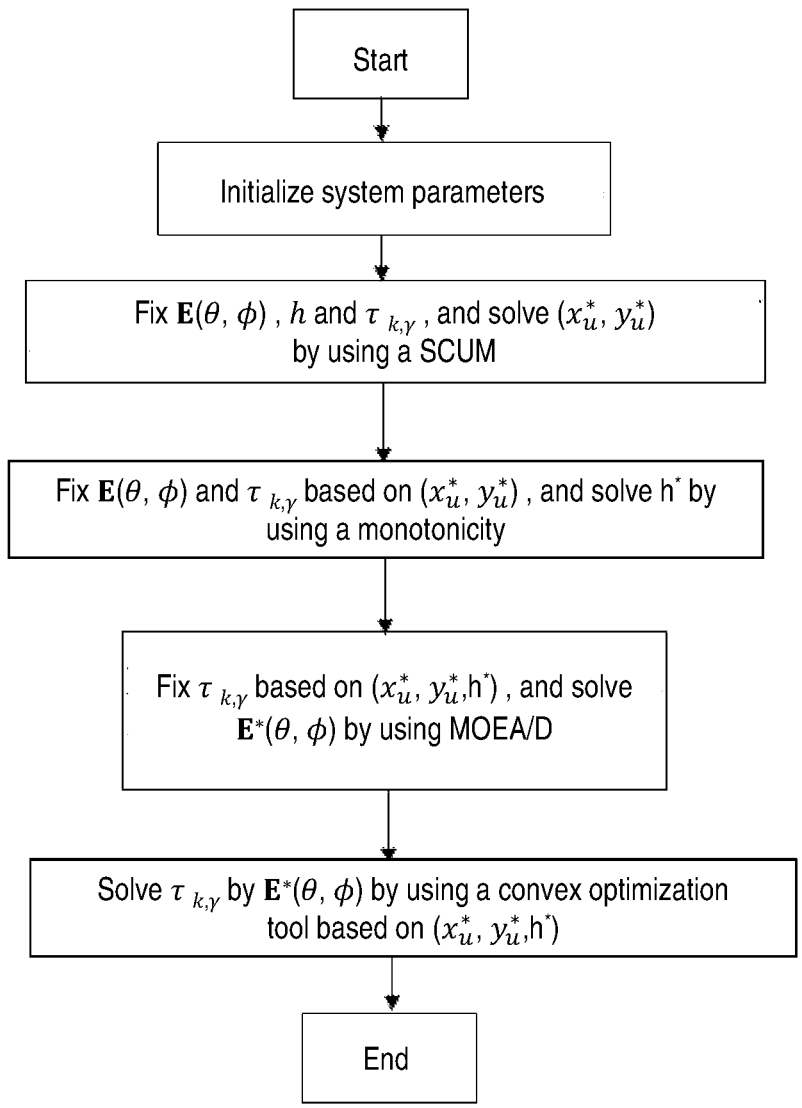
FIG. 4 is a flowchart of a low-complexity iterative algorithm for jointly optimizing a three-dimensional position deployment of the unmanned aerial vehicle, a charging time and an energy beam in the embodiment of the present invention.

As shown in FIG. 4, system parameters, a value range of the optimization variables and the constraint conditions of the wireless power transfer network are set; and the low-complexity algorithm comprises the following steps:

S1. fixing the altitude h, the beam pattern $E(\theta, \phi)$ and the charging time $\tau_{k,\gamma}$ of the unmanned aerial vehicle, and solving the objective function with respect to a two-dimensional coordinate $(x_u, y_u)$ of the unmanned aerial vehicle by using sequential unconstrained convex minimization (SUCM) at the moment;

S2. fixing the beam pattern $E(\theta, \phi)$ and the charging time $\tau_{k,\gamma}$ based on the two-dimensional coordinate $(x_u, y_u)$ of the unmanned aerial vehicle, the objective function becoming a monotone decreasing function with respect to the altitude h at the moment, and obtaining an optimal altitude $$h^* = \max\left\{\frac{\sqrt{D_{max}}}{\tan\Theta}, h_{min}\right\},$$

while $D_{max} = \max_{k=1,\ldots,K} D_k$ and $D_k = \|z_k - z_u\|^2$;

S3. fixing the charging time $\tau_{k,\gamma}$ based on the three-dimensional position deployment of the unmanned aerial vehicle, and optimizing the energy beam pattern by using a multiobjective evolutionary algorithm based on decomposition (MOEA/D), wherein the energy beam pattern comprises an antenna gain, a minor lobe voltage level and a beam width, and since the antenna gain, the minor lobe voltage level and the beam width are functions with respect to a phase β, the antenna gain, the minor lobe voltage level and the beam width optimized are expressed as a multiobjective optimization problem with respect to the phase β; and S4. based on the optimal three-dimensional position, the optimal altitude and the optimal energy beam pattern of the unmanned aerial vehicle which are solved, solving the objective function which is a linear programming problem of a function with respect to the charging time $\tau_{k,\gamma}$ at the moment by using a standard convex optimization tool.

For further implementation, the step S1 comprises the following steps:

S1.1. initializing iteration times m, a polyhedron $$S^{(1)} = \left\{t \in R_-^K : -\sum_{k=1}^{K} t_k \leq \frac{1}{\varsigma}\right\}$$

and a vertex set $$v^{(1)} = \left\{-\frac{1}{\varsigma} e_k \in R^K : 1 \leq k \leq K\right\} \cup \{0\},$$

wherein $R_-^K$ is a K-dimensional negative real number, and $R^K$ is a K-dimensional non-negative real number; a best feasible solution of $\max_{t \in \tilde{D}} v^T t$ is $t^*$, satisfying $q(t_0) < q(t^*)$, wherein $t_0$ is a known quantity, while $t^*$ is a solved quantity; $q(t) = A_k t^{-\alpha/2}$, and $A_k = \xi_k \beta_0 P_0 \tau_{k,\gamma} |E(\theta, \phi)|^2$; $\varsigma > 0$; $\tilde{D} = \{t-t_0 | t \in D\}$, $D = \{t \in R_+^K : \varepsilon_k(x_u, y_u) \leq t_k, =1, \ldots, K\}$, and D is a domain of definition of t, $\tilde{D}$ is a domain of definition of $t-t_0$, and $\varepsilon_k(x_u, y_u) = (x_k - x_u)^2 + (y_k - y_u)^2 + h^2$;

S1.2. for all $-w=v$, $v \in V^m$, solving $$\min_{x_u, y_u} \sum_{k=1}^{K} w_k [(x_k - x_u)^2 + (y_k - y_u)^2 + h^2]^{\alpha/2}$$

to obtain optimal values $\mu(w)$ and $(x_u^*, y_u^*)$, wherein $$x_u^* = \frac{\sum_{k=1}^{K} w_k x_k}{\sum_{k=1}^{K} w_k},$$

and $$y_u^* = \frac{\sum_{k=1}^{K} w_k y_k}{\sum_{k=1}^{K} w_k},$$

wherein $w = [w_1, \ldots, w_k]$ is a k-dimensional vector, and $v^m$ is a m-dimensional vector;

S1.3. judging whether an inequality $\max_{-w \in v^m} -\mu(w) + w^T t_0 \leq 1$ is true, and if the inequality is true, returning to the S1.1; and if the inequality is not true, skipping to the step S1.4;

S1.4. obtaining $\tilde{w} = [\tilde{w}_1, \ldots, \tilde{w}_k]$ through $\max_{-w \in v^m} -\mu(w) + w^T t_0$, and $\tilde{t}_k = \varepsilon_k(\tilde{x}_u, \tilde{y}_u)$, $k=1, \ldots, K$, wherein $\varepsilon_k(\tilde{x}_u, \tilde{y}_u) = (x_k - \tilde{x}_u)^2 + (y_k - \tilde{y}_u)^2 + h^2$; and after obtaining $\tilde{w}$ and $\tilde{t}_k$, further obtaining a two-dimensional position $(\tilde{x}_u, \tilde{y}_u)$ of the unmanned aerial vehicle, while $(\tilde{x}_u, \tilde{y}_u)$ is obtained respectively by the following formulas $$\tilde{x}_u = \frac{\sum_{k=1}^{K} \tilde{w}_k x_k}{\sum_{k=1}^{K} \tilde{w}_k}$$

and $$\tilde{y}_u = \frac{\sum_{k=1}^{K} \tilde{w}_k y_k}{\sum_{k=1}^{K} \tilde{w}_k};$$

S1.5. judging whether an inequality $q(\tilde{t}) \leq q(t^*)$ is true, and if the inequality is true, updating $t^* = \tilde{t}$, wherein $\tilde{t} = [\tilde{t}_1, \ldots, \tilde{t}_K]$; otherwise, calculating $\vartheta$ and $S^{(m+1)}$ by using $\vartheta = \sup\{\rho : q(t_0 + \rho^*(\tilde{t} - t_0)) \leq q(t^*)\}$ and $$S^{(m+1)} = S^{(m)} \cap \left\{ t^T(\tilde{t} - t_0) \leq \frac{1}{\vartheta} \right\}$$

respectively, wherein $\vartheta \geq 1$; and under a condition of obtaining variables $\rho$ and $\vartheta$, using an analytic center cutting-plane method (ACCPM) algorithm to cut the polyhedron; and S1.6. judging whether iteration times m of the algorithm satisfy set times, if the set times are not satisfied, m:=m+1, returning to the step S1.2, and if the set times are satisfied, obtaining the two-dimensional position $(x_u^*, y_u^*)$ of the unmanned aerial vehicle.

Further, in the step S2, the beam pattern $E(\theta, \phi)$ and the charging time $\tau_{k,\gamma}$ are fixed based on the obtained two-dimensional position of the unmanned aerial vehicle, and the optimization problem is expressed as follows at the moment:

$$\max_{h} \sum_{k=1}^{K} \frac{A_k}{[D_k + h^2]^{\alpha/2}} \quad (9a)$$

$$s.t. \ D_{max} \leq h^2 \tan\Theta, \quad (9b)$$

$$h_{min} \leq h \leq h_{max}, \quad (9c)$$

wherein a constraint condition $D_{max} \leq h^2 \tan\Theta$ shows that a distance between the unmanned aerial vehicle and all the users is not allowed to exceed the coverage radius of the unmanned aerial vehicle; and since the optimization problem is a convex optimization problem, while the objective function is a monotone decreasing function with respect to the altitude h of the unmanned aerial vehicle, then the optimal altitude is as follows:

$$h^* = \max\left\{\frac{\sqrt{D_{max}}}{\tan\Theta}, h_{min}\right\} \quad (10)$$

Further, the step S3 comprises the following steps:

S3.1. based on the obtained three-dimensional position $(x_u^*, y_u^*, h^*)$ of the unmanned aerial vehicle, the charging time $\tau_{k,\gamma}$ is fixed, so that the objective function is expressed as follows:

$$\max \sum_{k=1}^{K} \eta_k |E(\theta, \phi)|^2, \quad (11)$$

wherein $$\eta_k = \frac{\xi_k \beta_0 P_0 \tau_{k,\gamma}}{[\|z_k - z_u\|^2 + h^2]^{\alpha/2}}$$

is a constant; therefore, the objective function is expressed as follows:

$$\max \sum_{k=1}^{K} |E(\theta, \phi)|^2 \quad (12)$$

S3.2. modeling into a multiobjective optimization problem, and objective functions thereof are expressed as follows:

$$\min F(\beta) = (f_1(\beta), f_2(\beta), f_3(\beta))^T, \quad (13a)$$

$$s \cdot t \cdot \beta \in R^M, \quad (13b)$$

wherein $f_1(\beta) = \text{SLL}(\beta)$: an objective function of a minimized minor lobe voltage level with respect to $$\beta; f_2(\beta) = \frac{1}{|E(\theta, \phi)|}:$$

an objective function of a maximized antenna gain with respect to $\beta$; and $$f_3(\beta) = \frac{1}{|\Theta|}:$$

an objective function of a maximized beam width $\Theta$ of the array antenna with respect to $\beta$;

S3.3. definition of domination: assuming that $u, v \in R^m$, u dominating v, and if and only if $$u_i \leq v_i, \forall i \in \{1, \ldots m\}, \quad (14)$$

$$u_j < v_j, \forall j \in \{1, \ldots m\}; \quad (15)$$

S3.4. definition of Pareto optimality: $x^* \in \Omega$ being the Pareto optimality, satisfying a condition that no other solution $x \in \Omega$ exists, so that $F(x)$ dominates $F(x^*)$, and $F(x^*)$ being a Pareto optimal vector; and S3.5. aiming at the constructed multiobjective optimization problem, using the MOEA/D to generate a directional beam.

Further, the MOEA/D has the specific steps as follows:

A1. inputting: the constructed multiobjective optimization problem; Iter: iteration times; $N_{pop}$: a number of subproblems; $\kappa^1, \ldots, \kappa^{N_{pop}}$: a weight vector; and $T_{nei}$: a number of neighbor vectors of each weight vector;

A2. initializing: a set EP=Ø;

A3. for each i=1, ..., $N_{pop}$, setting $\hbar(i)=\{i_1 \ldots, i_{T_{nei}}\}$ as an index of the neighbor vector according to $T_{nei}$ weight vectors $\kappa^1, \ldots, \kappa^{N_{pop}}$ near an Euclidean distance weight i the most;

A4. randomly generating an original group $\beta=[\beta_1, \ldots, \beta_{N_{pop}}]$; and setting $FV_i=F(\beta_i)$;

A5. for each j=1, ..., d, initializing $z=(z_1, \ldots, z_j, \ldots, z_d)^T$ through $z_j=\min\{f_j(\beta), \beta \in R^M\}$, wherein d is a number of objective functions;

A6. updating: for each i=1, ..., $N_{pop}$, randomly selecting two indexes $\kappa$ and $\iota$ from a set $\hbar(i)$, and combining $\beta_\kappa$ and $\beta_\iota$ to generate a new feasible solution y by a differential evolution algorithm; for each j=1, ..., d, if $z_j > f_j(y)$, setting $z_j = f_j(y)$; at the moment, $z_j$ being a current optimal solution; for each $j \in \hbar(i)$, if $g^{te}(y|\kappa^j, z) \leq g^{te}(\beta_j|\kappa^j, z)$, setting $\beta_j = y$ and $FV_j = F(y)$, wherein $g^{te}(y|\kappa^j, z) = \max_{1 \leq j \leq d}\{\kappa^j|f_j(y) - z_j|\}$; eliminating a solution dominated by F(y) from the set EP; and if no vector exists in the set EP to dominate F(y), adding F(y) into the set EP;

A7. stopping criterion: if the iteration times satisfy Iter, entering into step A8; otherwise, returning to the updating step A6; and A8. outputting: constantly updating a non-dominant solution EP during searching, and finally obtaining an optimal domination set EP*, and a Pareto optimal solution β*, so that EP*∈β*.

Further, in the step S4, based on the obtained three-dimensional position ($x_u^*, y_u^*, h^*$) of the unmanned aerial vehicle and the beam pattern $E^*(\theta, \phi)$, the original problems become $$\max_{\tau_{k,\gamma}} \sum_{k=1}^{K} \frac{\xi_k \beta_0 P_0 \tau_{k,\gamma} |E(\theta, \phi)|^2}{[\|z_k - z_u\|^2 + h^2]^{\alpha/2}} \quad (16a)$$

$$\text{s.t.} \sum_{\gamma=1}^{\Gamma} \tau_{k,\gamma} = T; \quad (16b)$$

The solution of the above problems may lead to serious fairness problems, and the reason is that when the total energy harvested in a certain area is significantly greater than that in other areas, the charging time in this area is longer; and in order to solve this difficulty, the following new optimization problems are proposed:

$$\max_{\tau_{k,\gamma}} \sum_{k=1}^{K} \min_{k \in K} \frac{\xi_k \beta_0 P_0 \tau_{k,\gamma} |E(\theta, \phi)|^2}{[(x_k - x_{u,\gamma})^2 + (y_k - y_{u,\gamma})^2 + h_\gamma^2]^{\alpha/2}} \quad (17a)$$

$$\text{s.t.} \sum_{\gamma=1}^{\Gamma} \tau_{k,\gamma} = T; \quad (17b)$$

at the moment, the three-dimensional position of the unmanned aerial vehicle in the area γ is ($x_{u,\gamma}, y_{u,\gamma}, h_\gamma$); and in order to solve this problem, an auxiliary variable t is introduced, then:

$$\max_{\tau_{k,\gamma}} t \quad (18a)$$

$$\text{s.t.} \sum_{\gamma=1}^{\Gamma} \tau_{k,\gamma} \varrho(x_{u,\gamma}, y_{u,\gamma}, h_\gamma) \geq t, \quad (18b)$$

$$\sum_{\gamma=1}^{\Gamma} \tau_{k,\gamma} = T, \quad (18c)$$

wherein $$\varrho(x_{u,\gamma}, y_{u,\gamma}, h_\gamma) = \sum_{k=1}^{K} \frac{\xi_k \beta_0 P_0 \tau_{k,\gamma} |E(\theta, \phi)|^2}{[(x_k - x_{u,\gamma})^2 + (y_k - y_{u,\gamma})^2 + h_\gamma^2]^{\alpha/2}};$$

and the optimization problem is a linear programming problem, which is solved by a general convex optimization tool.

Further, in the step S4:

A1. inputting: the constructed multiobjective optimization problem; Iter: iteration times; $N_{pop}$: a number of subproblems; $\kappa^1, \ldots, \kappa^{N_{pop}}$: a weight vector; and $T_{nei}$: a number of neighbor vectors of each weight vector;

A2. initializing: a set EP=Ø;

A3. for each i=1, ..., $N_{pop}$, setting $\hbar(i)=\{i_1 \ldots, i_{T_{nei}}\}$ as an index of the neighbor vector according to $T_{nei}$ weight vectors $\kappa^1, \ldots, \kappa^{N_{pop}}$ nearest an Euclidean distance weight i;

A4. randomly generating an original group $\beta=[\beta_1, \ldots, \beta_{N_{pop}}]$; and setting $FV_i=F(\beta_i)$;

A5. for each j=1, ..., d, initializing $z=(z_1, \ldots, z_j, \ldots, z_d)^T$ through $z_j=\min\{f_j(\beta), \beta \in R^{M \times N}\}$, wherein d is a number of objective functions;

A6. updating: for each i=1, ..., $N_{pop}$, randomly selecting two indexes $\kappa$ and $\iota$ from a set $\hbar(i)$, and combining $\beta_\kappa$ and $\beta_\iota$ to generate a new feasible solution y by a differential evolution algorithm; for each j=1, ..., d, if $z_j > f_j(y)$, setting $z_j = f_j(y)$; at the moment, $z_j$ being a current optimal solution; for each $j \in \hbar(i)$, if $g^{te}(y|\kappa^j, z) \leq g^{te}(\beta_j|\kappa^j, z)$, setting $\beta_j = y$ and $FV_j = F(y)$, wherein $g^{te}(y|\kappa^j, z) = \max_{1 \leq j \leq d}\{\kappa^j|f_j(y) - z_j|\}$; eliminating a solution dominated by F(y) from the set EP; and if no vector exists in the set EP to dominate F(y), adding F(y) into the set EP;

A7. stopping criterion: if the iteration times satisfy Iter, entering into step A8; otherwise, returning to the updating step A6; and A8. outputting: constantly updating a non-dominant solution EP during searching, and finally obtaining an optimal domination set EP*, and a Pareto optimal solution β*, so that EP*∈β*.

Further, in the step S4:

based on the obtained three-dimensional position ($x_u^*, y_u^*, h^*$) of the unmanned aerial vehicle and the beam pattern $E^*(\theta, \phi)$, the original problems become $$\max_{\tau_{k,\gamma}} \sum_{k=1}^{K} \frac{\xi_k \beta_0 P_0 \tau_{k,\gamma} |E(\theta, \phi)|^2}{[\|z_k - z_u\|^2 + h^2]^{\alpha/2}} \quad (16a)$$

$$\text{s.t.} \sum_{\gamma=1}^{\Gamma} \tau_{k,\gamma} = T; \quad (16b)$$

based on the obtained three-dimensional position $(x_u^*, y_u^*, h^*)$ of the unmanned aerial vehicle and the beam pattern $E^*(\theta, \phi)$, original problem become $$\max_{\tau_{k,\gamma}} \sum_{k=1}^{K} \frac{\xi_k \beta_0 P_0 \tau_{k,\gamma} |E(\theta, \phi)|^2}{[\|z_k - z_u\|^2 + h^2]^{\alpha/2}} \quad (16a)$$

$$\text{s.t.} \sum_{\gamma=1}^{\Gamma} \tau_{k,\gamma} = T; \quad (16b)$$

The solution of the above problems may lead to serious fairness problems, and the reason is that when the total energy harvested in a certain area is significantly greater than that in other areas, the charging time in this area is longer; and in order to solve this difficulty, the following new optimization problems are proposed:

$$\max_{\tau_{k,\gamma}} \sum_{k=1}^{K} \min_{k \in K} \frac{\xi_k \beta_0 P_0 \tau_{k,\gamma} |E(\theta, \phi)|^2}{[(x_k - x_{u,\gamma})^2 + (y_k - y_{u,\gamma})^2 + h_\gamma^2]^{\alpha/2}} \quad (17a)$$

$$\text{s.t.} \sum_{\gamma=1}^{\Gamma} \tau_{k,\gamma} = T; \quad (17b)$$

at the moment, the three-dimensional position of the unmanned aerial vehicle in the area $\gamma$ is $(x_{u,\gamma}, y_{u,\gamma}, h_\gamma)$; and in order to solve this problem, an auxiliary variable t is introduced, then:

$$\max_{\tau_{k,\gamma}} t \quad (18a)$$

$$\text{s.t.} \sum_{\gamma=1}^{\Gamma} \tau_{k,\gamma} \varrho(x_{u,\gamma}, y_{u,\gamma}, h_\gamma) \geq t, \quad (18b)$$

$$\sum_{\gamma=1}^{\Gamma} \tau_{k,\gamma} = T, \quad (18c)$$

wherein $$\varrho(x_{u,\gamma}, y_{u,\gamma}, h_\gamma) = \sum_{k=1}^{K} \frac{\xi_k \beta_0 P_0 \tau_{k,\gamma} |E(\theta, \phi)|^2}{[(x_k - x_{u,\gamma})^2 + (y_k - y_{u,\gamma})^2 + h_\gamma^2]^{\alpha/2}};$$

and the optimization problem is a linear programming problem, which is solved by a general convex optimization tool.

In step 4, a three-dimensional flight trajectory of the unmanned aerial vehicle is designed based on Branch and Bound.

An objective function of optimization problems based on a minimized flight distance is the minimized flight distance, which is expressed as follows:

$$\sum_{\substack{a=0 \\ a \neq b}}^{\Gamma} \sum_{\substack{b=0 \\ a \neq b}}^{\Gamma} d_{ab} x_{ab}, \quad (19)$$

optimization variables of the optimization problems are able to be expressed as:

1> a distance $d_{ab} = \sqrt{(x_a - x_b)^2 + (y_a - y_b)^2 + (h_a - h_b)^2}$ between a hovering position a with a coordinate $(x_a, y_a, h_a)$ and a hovering position b with a coordinate $(x_b, y_b, h_b)$; and 2> a non-negative integer $x_{ab} \in \{0, 1\}$;

constraint conditions of the optimization problem comprise:

1] a number of times of flying from the hovering position a to the hovering position b being no more than 1:

$$\sum_{\substack{a=0 \\ a \neq b}}^{\Gamma} x_{ab} = 1;$$

2] a number of times of flying from the hovering position b to the hovering position a being no more than 1:

$$\sum_{\substack{b=0 \\ b \neq a}}^{\Gamma} x_{ab} = 1;$$

3] a number of times of flying from the hovering position a to an original position 0 is no more than 1: and $$\sum_{a=1}^{\Gamma} x_{a0} = 1;$$

4] a number of times of staying on the hovering position being no more than $\gamma$: $\mu_a - \mu_b + \gamma x_{ab} \leq \gamma - 1$, wherein $\gamma > \Gamma$, $\mu_a$ and $\mu_b$ are arbitrary real variables, and $a = 1, \ldots, \Gamma$, $b = 1, \ldots, \Gamma$;

the optimization problems based on the minimized flight distance are as follows:

$$\min \sum_{\substack{a=0 \\ a \neq b}}^{\Gamma} \sum_{\substack{b=0 \\ b \neq a}}^{\Gamma} d_{ab} x_{ab} \quad (20a)$$

$$\text{s.t.} \sum_{\substack{a=0 \\ a \neq b}}^{\Gamma} x_{ab} = 1, \quad (20b)$$

$$\sum_{\substack{b=0 \\ b \neq a}}^{\Gamma} x_{ab} = 1, \quad (20c)$$

$$\sum_{a=1}^{\Gamma} x_{a0} = 1, \quad (20d)$$

$$\mu_a - \mu_b + \gamma x_{ab} \leq \gamma - 1; \quad (20e)$$

the steps for obtaining the optimal flight trajectory by Branch and Bound are as follows:

firstly, decomposing all flight trajectory sets, namely feasible solutions, into smaller sets by the low-complexity algorithm, and calculating a lower bound of each set; then, containing a set of a smallest lower bound in all the sets in the optimal trajectory; and finally, forming all the selected sets into the optimal flight trajectory.

The invention proposes to apply a three-dimensional energy beam forming technology to the wireless power transfer network, establishes a mathematical optimization problem of the network model based on maximizing the energy harvested by the user, and applies the low-complexity iterative algorithms to jointly optimize the three-dimensional position deployment of the unmanned aerial vehicle, the charging time and the energy beam pattern to maximize the energy harvested by the user in a coverage area while meeting restrictions on an altitude and the coverage area of the unmanned aerial vehicle.

The foregoing is only the preferred embodiments of the present invention, but the scope of protection of the present invention is not limited to this. The equivalent substitutions or changes made by those skilled in the art according to the technical solutions and the inventive concept of the present invention within the scope disclosed by the present invention all belong to the scope of protection of the present invention.

What is claimed is:

1. A method for designing a three-dimensional trajectory of an unmanned aerial vehicle based on a wireless power transfer network, comprising the following steps of:
   step 1: establishing a downlink channel model of the wireless power transfer network: combining a three-dimensional dynamic energy beam forming with a direct path to form a channel model between an unmanned aerial vehicle and a user;
   step 2: establishing a mathematical model based on maximizing energy harvested by a user, comprising mathematical expressions for determining an optimization variable, an objective function and a constraint condition;
   step 3: establishing a low-complexity iterative algorithm for jointly optimizing a three-dimensional position deployment of the unmanned aerial vehicle, a charging time and an energy beam; and
   step 4: designing a three-dimensional flight trajectory of the unmanned aerial vehicle based on branch and bound method,
   wherein, in the step 1:
   the wireless power transfer network comprises a quadrotor unmanned aerial vehicle and K users randomly distributed on land, the unmanned aerial vehicle is provided with a linear array comprising M antenna elements, while the users on land are provided with a single antenna; a land geometric area is divided into Γ service areas; a position coordinate of a user k is $z_k=(x_k, y_k, 0)$, and $k \in \{1, \ldots, K\}$ is an index of an user set; a three-dimensional position of the unmanned aerial vehicle is $z_u=(x_u, y_u, h)$, and h represents an altitude of the unmanned aerial vehicle; and a wireless channel between the unmanned aerial vehicle and the user k is dominated by the direct path, so that a channel vector $h_k$ is as follows:

$$h_k = \sqrt{\beta_0 d_k^{-\alpha}} \alpha(\theta, \phi),$$

wherein $\eta_k = \beta_0 d_k^{-1}$ is a multiplexing coefficient, and $\beta_0$ is a channel power gain when a reference distance is 1 m; in addition, $d_k = \sqrt{(x_k-x_u)^2+(y_k-y_u)^2+h^2}$ is a distance between the unmanned aerial vehicle and the user k, $\alpha$ is a path loss coefficient; and $\alpha(\theta, \phi)$ is a direction vector, which is expressed as follows:

$$\alpha(\theta,\phi)=[1, e^{j2\pi/\lambda d_{array}\sin\theta \cos\phi}, \ldots, e^{j(M-1)2\pi/\lambda d_{array}\sin\theta \cos\phi}]^T,$$

wherein λ and $d_{array}$ are respectively a wavelength and an element spacing in the linear array, and an elevation angle θ and an azimuth angle φ are known quantities; therefore, a channel gain between the unmanned aerial vehicle and the user k is expressed as follows:

$$|H_k^H w|^2 = \frac{\beta_0}{[(x_k-x_u)^2+(y_k-y_u)^2+h^2]^{\alpha/2}}|a^H(\theta, \phi)w|^2,$$

wherein H represents conjugate transpose, w is a beam weight vector, and a main lobe direction is controlled by adjusting a weight value; and $E(\theta, \phi)=\alpha^H(\theta, \phi)w$ is a synthesized pattern of the linear array;
   the linear array installed on the unmanned aerial vehicle as a transmitting end is divided into t sub-arrays, and each sub-array independently generates an energy beam to aim at a certain user; therefore, for the linear array comprising M antenna elements, an array factor and a synthesized pattern are expressed as follows:

$$AF = \sum_{m=1}^{M=1} I_m \times e^{j(m-1)(\kappa\beta\sin\theta\cos\phi+\beta)},$$

$$E(\theta, \phi) = \sum_{m=1}^{M=1} p_m(\theta, \phi) I_m \times e^{j(m-1)(\kappa d\sin\theta\cos\phi+\beta)},$$

wherein $\kappa=2\pi/\lambda$, $p_m(\theta, \phi)$ and $I_m$ are respectively an element pattern and an excitation amplitude of an $m^{th}$ antenna element, and β is a uniformly graded phase; and d is an array element spacing, and e is a natural constant.

2. The method for designing the three-dimensional trajectory of the unmanned aerial vehicle based on the wireless power transfer network according to claim 1, wherein, in the step 2:
   total energy harvested by the user k is expressed as follows:

$$Q_k = \xi_k |h_k^H w|^2 P_0 \tau_{k,\gamma}$$
   $$= \frac{\xi_k \beta_0 P_0 \tau_{k,\gamma} |E(\theta, \phi)|^2}{[(x_k-x_u)^2+(y_k-y_u)^2+h^2]^{\alpha/2}},$$

wherein $\xi_k$ is an energy conversion efficiency, $0<\xi_k<1$, $P_0$ is a transmitting power of the unmanned aerial vehicle, and $\tau_{k,\gamma}$ is a charging time of the user k in a $\gamma^{th}$ area;
   optimization variables of the mathematical model based on maximizing the energy harvested by the user comprise:
   a two-dimensional coordinate of the unmanned aerial vehicle, which is namely $z_u=(x_u, y_u, 0)$;
   an altitude h of the unmanned aerial vehicle;
   an energy beam pattern $E(\theta, \phi)$ of the linear array; and
   a charging time $\tau_{k,\gamma}$ of the user k located in the $\gamma^{th}$ service area;
   constraint conditions of the mathematical model based on maximizing the energy harvested by the user comprise:
   a maximum horizontal distance between the unmanned aerial vehicle and the user being no more than a coverage radius of the unmanned aerial vehicle: $\|z_k-z_u\|^2 \leq h^2 \tan^2\Theta$; and Θ being a beam width;

a total charging time of the unmanned aerial vehicle in all the Γ service areas being no more than a charging period T:

$$\sum_{\gamma=1}^{\Gamma} \tau_{k,\gamma} = T;$$

the altitude of the unmanned aerial vehicle being constrained to: $h_{min} < h < h_{max}$, wherein $h_{min}$ and $h_{max}$ are respectively a lowest altitude and a highest altitude that the unmanned aerial vehicle is able to reach;

the mathematical model based on maximizing the energy harvested by the user is as follows:

$$\max_{z_u,h,\tau_{k,\gamma},E(\theta,\phi)} \sum_{k=1}^{K} \frac{\xi_k \beta_0 P_0 \tau_{k,\gamma} |E(\theta,\phi)|^2}{[\|z_k - z_u\|^2 + h^2]^{\alpha/2}}$$

$$s.t. \|z_k - z_u\|^2 \le h^2 \tan^2\Theta,$$

$$\sum_{\gamma=1}^{\Gamma} \tau_{k,\gamma} = T,$$

$$h_{min} < h < h_{max}.$$

3. The method for designing the three-dimensional trajectory of the unmanned aerial vehicle based on the wireless power transfer network according to claim 1, wherein, in the step 3, system parameters, a value range of the optimization variables and the constraint conditions of the wireless power transfer network are set; and the low-complexity iterative algorithm comprises the following steps:

S1. fixing the altitude h, the beam pattern $E(\theta, \phi)$ and the charging time $\tau_{k,\gamma}$ of the unmanned aerial vehicle, and solving the objective function with respect to a two-dimensional coordinate $(x_u, y_u)$ of the unmanned aerial vehicle by using sequential unconstrained convex minimization at the moment;

S2. fixing the beam pattern $E(\theta, \phi)$ and the charging time $\tau_{k,\gamma}$ based on the two-dimensional coordinate $(x_u, y_u)$ of the unmanned aerial vehicle, the objective function becoming a monotone decreasing function with respect to the altitude h at the moment, and obtaining an optimal altitude $$h^* = \max\left\{\frac{\sqrt{D_{max}}}{\tan\Theta}, h_{min}\right\},$$

while $D_{max} = \max_{k=1,\ldots,K} D_k$, and $D_k = \|z_k - z_u\|^2$;

S3. fixing the charging tune $\tau_{k,\gamma}$ based on the three-dimensional position deployment of the unmanned aerial vehicle, and optimizing the energy beam pattern by using a multiobjective evolutionary algorithm based on decomposition, wherein the energy beam pattern comprises an antenna gain, a minor lobe voltage level and a beam width, and since the antenna gain, the minor lobe voltage level and the beam width are functions with respect to a phase β, the antenna gain, the minor lobe voltage level and the beam width optimized are expressed as a multiobjective optimization problem with respect to the phase β; and S4. based on the optimal three-dimensional position, the optimal altitude and the optimal energy beam pattern of the unmanned aerial vehicle which are solved, solving the objective function which is a linear programming problem of a function with respect to the charging time $\tau_{k,\gamma}$ at the moment by using a standard convex optimization tool.

4. The method for designing the three-dimensional trajectory of the unmanned aerial vehicle based on the wireless power transfer network according to claim 3, wherein, the step S1 comprises the following steps:

S1.1. initializing iteration times m, a polyhedron $$S^{(1)} = \left\{t \in R_-^K : -\sum_{k=1}^{K} t_k \le \frac{1}{\varsigma}\right\}$$

and a vertex set $$v^{(1)} = \left\{-\frac{1}{\varsigma} e_k \in R^K : 1 \le k \le K\right\} \cup \{0\},$$

wherein $R_-^K$ is a K-dimensional negative real number, and $R^K$ is a K-dimensional non-negative real number; a best feasible solution of $\max_{t \in \tilde{D}} v^T t$ is $t^*$, satisfying $q(t_0) < q(t^*)$, wherein $t_0$ is a known quantity, while $t^*$ is a solved quantity; $q(t) = A_k t^{-\alpha/2}$, and $A_k = \xi_k \beta_0 P_0 \tau_{k,\gamma} |E(\theta, \phi)|^2$; $\varsigma > 0$; $\tilde{D} = \{t - t_0 | t \in D\}$, $D = \{t \in R_+^K : \varepsilon_k(x_u, y_u) \le t_k, =1, \ldots, K\}$, and D is a domain of definition of t, $\tilde{D}$ is a domain of definition of $t - t_0$, and $\varepsilon_k(x_u, y_u) = (x_k - x_u)^2 + (y_k - y_u)^2 + h^2$;

S1.2. for all $-w = v$, $v \in V^m$, solving $$\min_{x_u, y_u} \sum_{k=1}^{K} w_k [(x_k - x_u)^2 + (y_k - y_u)^2 + h^2]^{\alpha/2}$$

to obtain optimal values $\mu(w)$ and $(x_u^*, y_u^*)$, wherein $$x_u^* = \frac{\sum_{k=1}^{K} w_k x_k}{\sum_{k=1}^{K} w_k},$$

and $$y_u^* = \frac{\sum_{k=1}^{K} w_k y_k}{\sum_{k=1}^{K} w_k},$$

wherein $w = [w_1, \ldots, w_k]$ is a k-dimensional vector, and $v^m$ is a m-dimensional vector;

S1.3. judging whether an inequality $\max_{-w \in v^m} -\mu(w) + w^T t_0 \le 1$ is true, and if the inequality is true, returning to the S1.1; and if the inequality is not true, skipping to the step S1.4;

S1.4. obtaining $\tilde{w} = [\tilde{w}_1, \ldots, \tilde{w}_k]$ through $\max_{-w \in v^m} -\mu(w) + w^T t_0$, and $\tilde{t}_k = \varepsilon_k(\tilde{x}_u, \tilde{y}_u)$, $k = 1, \ldots, K$, wherein $\varepsilon_k(\tilde{x}_u, \tilde{y}_u) = (x_k - \tilde{x}_u)^2 + (y_k - \tilde{y}_u)^2 + h^2$; and after obtaining $\tilde{w}$ and $\tilde{t}_k$, further obtaining a two-dimensional position $(\tilde{x}_u, \tilde{y}_u)$ of the unmanned aerial vehicle, while $(\tilde{x}_u, \tilde{y}_u)$ is obtained respectively by the following formulas $$\tilde{x}_u = \frac{\sum_{k=1}^{K} \tilde{w}_k x_k}{\sum_{k=1}^{K} \tilde{w}_k}$$

and $$\tilde{y}_u = \frac{\sum_{k=1}^{K} \tilde{w}_k y_k}{\sum_{k=1}^{K} \tilde{w}_k},$$

S1.5. judging whether an inequality $q(\tilde{t}) \leq q(t^*)$ is true, and if the inequality is true, updating $t^* = \tilde{t}$, wherein $\tilde{t} = [\tilde{t}_1, \ldots, \tilde{t}_k]$; otherwise, calculating $\vartheta$ and $S^{(m+1)}$ by using $\vartheta = \sup\{\rho : q(t_0 + \rho^*(\tilde{t}-t_0)) \leq q(t^*)\}$ and $$S^{(m+1)} = S^{(m)} \cap \left\{ t^T(\tilde{t} - t_0) \leq \frac{1}{\vartheta} \right\}$$

respectively, wherein $\vartheta \geq 1$; and under a condition of obtaining variables $\rho$ and $\vartheta$, using an analytic center cutting-plane method (ACCPM) algorithm to cut the polyhedron; and S1.6. judging whether iteration times m of the algorithm satisfy set times, if the set times are not satisfied, m:=m+1, returning to the step S1.2, and if the set times are satisfied, obtaining the two-dimensional position $(x_u^*, y_u^*)$ of the unmanned aerial vehicle.

5. The method for designing the three-dimensional trajectory of the unmanned aerial vehicle based on the wireless power transfer network according to claim 3, wherein, in the step S2, the beam pattern $E(\theta, \phi)$ and the charging time $\tau_{k,\gamma}$ are fixed based on the obtained two-dimensional position of the unmanned aerial vehicle, and the optimization problem is expressed as follows at the moment:

$$\max_h \sum_{k=1}^{K} \frac{A_k}{[D_k + h^2]^{\alpha/2}}$$

$$s.t.\ D_{max} \leq h^2 \tan\Theta,$$

$$h_{min} \leq h \leq h_{max},$$

wherein a constraint condition $D_{max} \leq h^2 \tan\Theta$ shows that a distance between the unmanned aerial vehicle and all the users is not allowed to exceed the coverage radius of the unmanned aerial vehicle; and since the optimization problem is a convex optimization problem, while the objective function is a monotone decreasing function with respect to the altitude h of the unmanned aerial vehicle, then the optimal altitude is as follows:

$$h^* = \max\left\{ \frac{\sqrt{D_{max}}}{\tan\Theta}, h_{min} \right\}.$$

6. The method for designing the three-dimensional trajectory of the unmanned aerial vehicle based on the wireless power transfer network according to claim 3, wherein, the step S3 comprises the following steps:

S3.1. fixing the charging time $\tau_{k,\gamma}$ based on the obtained three-dimensional position $(x_u^*, y_u^*, h^*)$ of the unmanned aerial vehicle, so that the objective function is expressed as follows:

$$\max \sum_{k=1}^{K} \eta_k |E(\theta, \phi)|^2,$$

wherein $$\eta_k = \frac{\xi_k \beta_0 P_0 \tau_{k,\gamma}}{[\|z_k - z_u\|^2 + h^2]^{\alpha/2}}$$

is a constant; therefore, the objective function is expressed as follows:

$$\max \sum_{k=1}^{K} |E(\theta, \phi)|^2;$$

S3.2. modeling into a multiobjective optimization problem, and the objective functions of the multiobjective optimization problem are expressed as follows:

$$\min F(\beta) = (f_1(\beta), f_2(\beta), f_3(\beta))^T,$$

$$s.t.\ \beta \in R^M,$$

wherein $f_1 = \text{SLL}(\beta)$: an objective function of a minimized minor lobe voltage level with respect to $$\beta; f_2(\beta) = \frac{1}{|E(\theta, \phi)|}:$$

an objective function of a maximized antenna gain with respect to $\beta$; and $$f_3(\beta) = \frac{1}{|\Theta|}:$$

an objective function of a maximized beam width $\Theta$ of the array antenna with respect to $\beta$;

S3.3. definition of domination: assuming that u, v∈$R^m$, u dominating v, and if and only if $$u_i \leq v_i, \forall i \in \{1, \ldots m\},$$

$$u_j < v_j, \forall j \in \{1, \ldots m\};$$

S3.4. definition of Pareto optimality: x*∈Ω being the Pareto optimality, satisfying a condition that no other solution x∈Ω exists, so that F(x) dominates F(x*), and F(x*) being a Pareto optimal vector; and S3.5. aiming at the constructed multiobjective optimization problem, using the multiobjective evolutionary algorithm based on decomposition to generate a directional beam.

7. The method for designing the three-dimensional trajectory of the unmanned aerial vehicle based on the wireless power transfer network according to claim 6, wherein the multiobjective evolutionary algorithm based on decomposition comprises the specific steps as follows:

A1. inputting: the constructed multiobjective optimization problem; Iter: iteration times; $N_{pop}$: a number of subproblems; $\kappa^1, \ldots, \kappa^{N_{pop}}$: a weight vector; and $T_{nei}$: a number of neighbor vectors of each weight vector;

A2. initializing: a set EP=∅;

A3. for each i=1, ..., $N_{pop}$, setting $\hbar(i)=\{i_1 \ldots, i_{T_{nei}}\}$ as an index of the neighbor vector according to $T_{nei}$ weight vectors $\kappa^1, \ldots, \kappa^{N_{pop}}$ near an Euclidean distance weight i the most;

A4. randomly generating an original group $\beta=[\beta_1, \ldots, \beta_{N_{pop}}]$; and setting $FV_i=F(\beta_i)$;

A5. for each j=1, ..., d, initializing $z=(z_1, \ldots, z_j, \ldots, z_d)^T$ through $z_j=\min\{f_j(\beta), \beta \in R^M\}$, wherein d is a number of objective functions;

A6. updating: for each i=1, ..., $N_{pop}$, randomly selecting two indexes $\kappa$ and $\iota$ from a set $\hbar(i)$, and combining $\beta_\kappa$ and $\beta_\iota$ to generate a new feasible solution y by a differential evolution algorithm; for each j=1, ..., d, if $z_j > f_j(y)$, setting $z_j = f_j(y)$; at the moment, $z_j$ being a current optimal solution; for each $j \in \hbar(i)$, if $g^{te}(y|\kappa^j, z) \leq g^{te}(\beta_j|\kappa^j, z)$, setting $\beta_j = y$ and $FV_j = F(y)$, wherein $g^{te}(y|\kappa^j, z) = \max_{1 \leq j \leq d}\{\kappa^j | f_j(y) - z_j\}$; eliminating a solution dominated by F(y) from the set EP; and if no vector exists in the set EP to dominate F(y), adding F(y) into the set EP;

A7. stopping criterion: if the iteration times satisfy Iter, entering into step A8; otherwise, returning to the updating step A6; and A8. outputting: constantly updating a non-dominant solution EP during searching, and finally obtaining an optimal domination set EP*, and a Pareto optimal solution $\beta^*$, so that $EP^* \in \beta^*$.

8. The method for designing the three-dimensional trajectory of the unmanned aerial vehicle based on the wireless power transfer network according to claim 3, wherein in the step S4:

based on the obtained three-dimensional position $(x_u^*, y_u^*, h^*)$ of the unmanned aerial vehicle and the beam pattern $E^*(\theta, \phi)$, the original problems become:

$$\max_{\tau_{k,y}} \sum_{k=1}^{K} \frac{\xi_k \beta_0 P_0 \tau_{k,y} |E(\theta, \phi)|^2}{[\|z_k - z_u\|^2 + h^2]^{\alpha/2}}$$

$$s.t. \sum_{\gamma=1}^{\Gamma} \tau_{k,y} = T;$$

the following new optimization problems are proposed:

$$\max_{\tau_{k,\gamma}} \sum_{k=1}^{K} \min_{k \in K} \frac{\xi_k \beta_0 P_0 \tau_{k,y} |E(\theta, \phi)|^2}{[(x_k - x_{u,\gamma})^2 + (y_k - y_{u,\gamma})^2 + h_\gamma^2]^{\alpha/2}}$$

$$s.t. \sum_{\gamma=1}^{\Gamma} \tau_{k,y} = T;$$

at the moment, the three-dimensional position of the unmanned aerial vehicle in the area $\gamma$ is $(x_{u,\gamma}, y_{u,\gamma}, h_\gamma)$; and an auxiliary variable t is introduced, then:

$$\max_{\tau_{k,y}} t$$

$$s.t. \sum_{\gamma=1}^{\Gamma} \tau_{k,y} \varrho(x_{u,\gamma}, y_{u,\gamma}, h_\gamma) \geq t,$$

$$\sum_{\gamma=1}^{\Gamma} \tau_{k,y} = T,$$

wherein $$\varrho(x_{u,\gamma}, y_{u,\gamma}, h_\gamma) = \sum_{k=1}^{K} \frac{\xi_k \beta_0 P_0 \tau_{k,y} |E(\theta, \phi)|^2}{[(x_k - x_{u,\gamma})^2 + (y_k - y_{u,\gamma})^2 + h_\gamma^2]^{\alpha/2}};$$

and the optimization problem is a linear programming problem, which is solved by a convex optimization tool.

9. The method for designing the three-dimensional trajectory of the unmanned aerial vehicle based on the wireless power transfer network according to claim 1, wherein in the step 4:

an objective function of optimization problems based on a minimized flight distance is the minimized flight distance, which is expressed as follows:

$$\sum_{\substack{a=0 \\ a \neq b}}^{\Gamma} \sum_{\substack{b=0 \\ a \neq b}}^{\Gamma} d_{ab} x_{ab},$$

optimization variables of the optimization problems are able to be expressed as:

a distance $d_{ab} = \sqrt{(x_a - x_b)^2 + (y_a - y_b)^2 + (h_a - h_b)^2}$ between a hovering position a with a coordinate $(x_a, y_a, h_a)$ and a hovering position b with a coordinate $(x_b, y_b, h_b)$; and a non-negative integer $x_{ab} \in \{0,1\}$;

constraint conditions of the optimization problem comprise:

a number of times of flying from the hovering position a to the hovering position b being no more than 1:

$$\sum_{\substack{a=0 \\ a \neq b}}^{\Gamma} x_{ab} = 1;$$

a number of times of flying from the hovering position b to the hovering position a being no more than 1:

$$\sum_{\substack{a=0 \\ a \neq b}}^{\Gamma} x_{ab} = 1;$$

a number of times of flying from the hovering position a to an original position 0 is no more than 1:

$$\sum_{a=1}^{\Gamma} x_{a\beta} = 1;$$

and a number of times of staying on the hovering position being no more than $\gamma$: $\mu_a - \mu_b + \gamma x_{ab} \leq \gamma - 1$, wherein $\gamma > \Gamma$, $\mu_a$ and $\mu_b$ are arbitrary real variables, and $a=1, \ldots, \Gamma$, $b=1, \ldots, \Gamma$;

the optimization problems based on the minimized flight distance are as follows:

$$\min \sum_{\substack{a=0 \\ a \neq b}}^{\Gamma} \sum_{\substack{b=0 \\ b \neq a}}^{\Gamma} d_{ab} x_{ab}$$

$$s.t. \sum_{\substack{a=0 \\ a \neq b}}^{\Gamma} x_{ab} = 1,$$

$$\sum_{\substack{b=0 \\ b \neq a}}^{\Gamma} x_{ab} = 1,$$

$$\sum_{a=1}^{\Gamma} x_{a0} = 1,$$

$$\mu_a - \mu_b + \gamma x_{ab} \leq \gamma - 1;$$

the steps for obtaining the optimal flight trajectory by branch and bound method are as follows:

firstly, decomposing all flight trajectory sets, namely feasible solutions, into smaller sets by the low-complexity algorithm, and calculating a lower bound of each set; then, containing a set of a smallest lower bound in all the sets in the optimal trajectory; and finally, forming all the selected sets into the optimal flight trajectory.

* * * * *